(12) United States Patent
Wölfert et al.

(10) Patent No.: US 8,021,624 B2
(45) Date of Patent: Sep. 20, 2011

(54) REACTOR, AND METHOD FOR THE PRODUCTION OF HYDROGEN SULFIDE

(75) Inventors: Andreas Wölfert, Bad Rappenau (DE); Herald Jachow, Bensheim (DE); Heinz Drieβ, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/523,180

(22) PCT Filed: Jan. 14, 2008

(86) PCT No.: PCT/EP2008/050333
§ 371 (c)(1),
(2), (4) Date: Jul. 15, 2009

(87) PCT Pub. No.: WO2008/087110
PCT Pub. Date: Jul. 24, 2008

(65) Prior Publication Data
US 2010/0068128 A1 Mar. 18, 2010

(30) Foreign Application Priority Data
Jan. 16, 2007 (EP) .................................... 07100589

(51) Int. Cl.
*B01J 8/44* (2006.01)
*C01B 17/00* (2006.01)
*C01B 17/33* (2006.01)

(52) U.S. Cl. ...... 422/312; 422/652; 423/563; 423/573.1

(58) Field of Classification Search .................. None
See application file for complete search history.

(56) References Cited

U.S. PATENT DOCUMENTS
1,660,511 A * 2/1928 Jaeger ........................... 422/109
(Continued)

FOREIGN PATENT DOCUMENTS
DE 1113446 B 9/1961
(Continued)

OTHER PUBLICATIONS
Zimmermann, "Schwefelwasserstoff-Entwickler fuer das Laboratorium". Angew. Chem., vol. 74, 1962, No. 4, p. 151.
(Continued)

*Primary Examiner* — Melvin Mayes
*Assistant Examiner* — Sheng H Davis
(74) *Attorney, Agent, or Firm* — Connolly Bove Lodge & Hutz LLP

(57) ABSTRACT

The invention relates to a reactor (1) and a process for continuously preparing $H_2S$ by converting a reactant mixture which comprises essentially gaseous sulfur and hydrogen over a catalyst, comprising a sulfur melt (9) at least in a lower subregion (8) of the reactor (1), into which gaseous hydrogen is introduced. The catalyst is arranged in at least one U-shaped tube (21) which is partly in contact with the sulfur melt (9), the at least one U-shaped tube (21) having at least one entry orifice (23) on a limb (26) above the sulfur melt (9), through which the reactant mixture can enter the U-shaped tube (21) from a reactant region (10) of the reactor (1), having a flow path within the at least one U-shaped tube, along which the reactant mixture can be converted in a reaction region comprising the catalyst (22), and having at least one exit orifice (24) in another limb (27) through which a product can exit into a product region (7).

13 Claims, 2 Drawing Sheets

U.S. PATENT DOCUMENTS

Figure 1:
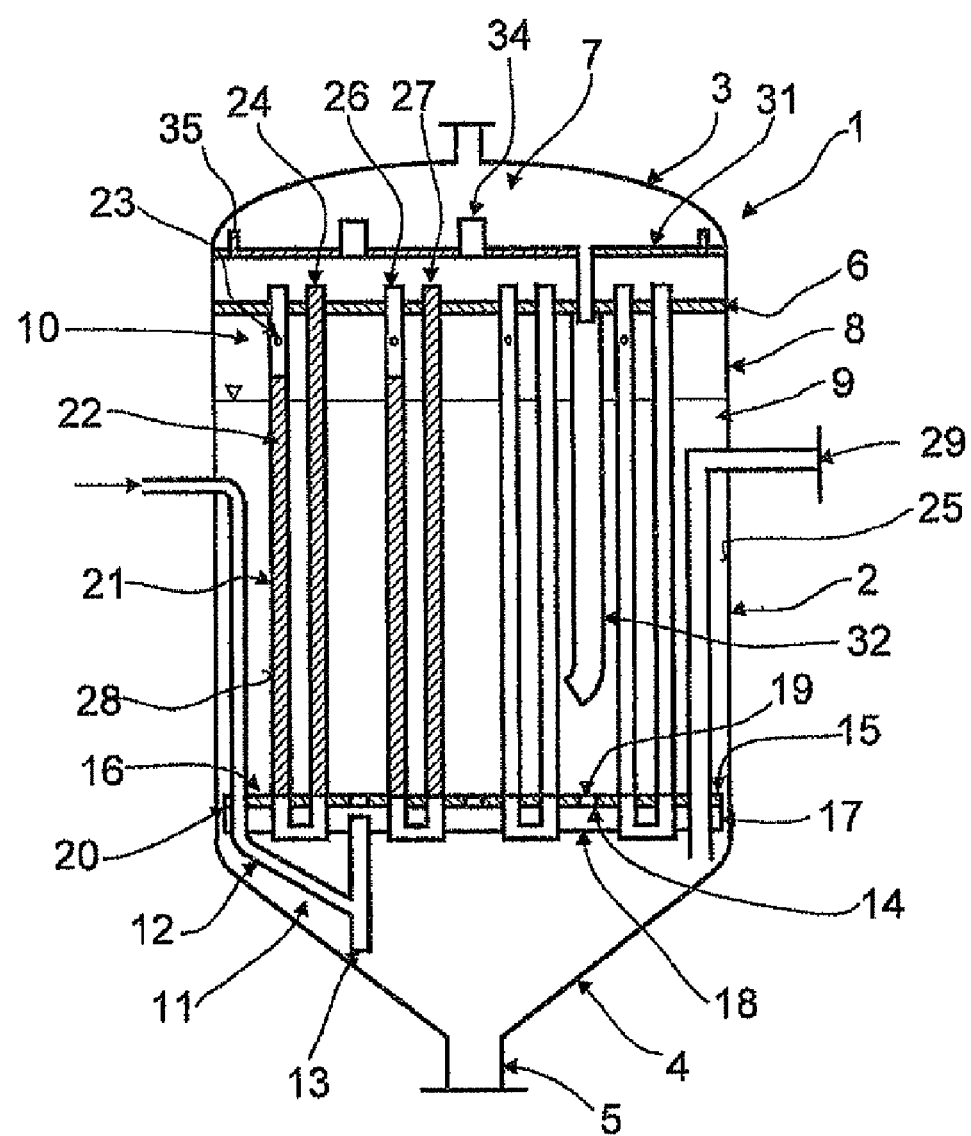

| | | | |
|---|---|---|---|
| 1,700,578 A * | 1/1929 | Bacon | 423/563 |
| 2,474,066 A | 6/1949 | Preisman et al. | |
| 2,687,948 A * | 8/1954 | Gregory et al. | 422/231 |
| 2,863,725 A | 12/1958 | Maude et al. | |
| 2,965,455 A * | 12/1960 | Maude et al. | 422/160 |
| 3,672,847 A * | 6/1972 | Esselink | 422/197 |
| 3,779,711 A * | 12/1973 | Gryaznov et al. | 422/149 |
| 4,233,269 A | 11/1980 | Kaye et al. | |
| 7,833,509 B2 * | 11/2010 | Wolfert et al. | 423/563 |
| 2006/0147357 A1 * | 7/2006 | Leveson | 422/224 |
| 2009/0317322 A1 * | 12/2009 | Wolfert et al. | 423/564 |
| 2010/0008839 A1 * | 1/2010 | Wolfert et al. | 423/244.09 |

FOREIGN PATENT DOCUMENTS

| | | |
|---|---|---|
| GB | 598885 A | 3/1948 |
| JP | 63197534 * | 8/1988 |
| WO | WO-99/46037 A1 | 9/1999 |
| WO | WO-99/50235 A1 | 10/1999 |

OTHER PUBLICATIONS

Ullmann's Encyclopedia of Industrial Chemistry, 6-th Edition, 2003, vol. 17, pp. 291-294.

* cited by examiner

REACTOR, AND METHOD FOR THE PRODUCTION OF HYDROGEN SULFIDE

PRIORITY

Priority is claimed as a national stage application (under 35 U.S.C. §371) to PCT/EP2008/050333, filed Jan. 14, 2008, which claims priority to European application 07100589.6, filed Jan. 16, 2007. The disclosures of the aforementioned priority applications are incorporated herein by reference in their entirety.

DESCRIPTION

The present invention relates to a reactor and to a process for continuously preparing hydrogen sulfide $H_2S$ by converting gaseous hydrogen and sulfur over a catalyst.

In the prior art, hydrogen sulfide is prepared, for example, by the $H_2S$ process according to Girdler (Ullmann's Encyclopedia of Industrial Chemistry, Sixth Edition, 2003, Vol. 17, page 291). In this process, $H_2S$ is prepare in a non-catalytic manner from the elements sulfur and hydrogen in a column with internals and an essentially horizontally aligned, extended bottom. Hydrogen is introduced into the bottom filled with boiling sulfur, and strips sulfur into the ascending gas phase. Hydrogen and ascending sulfur react in the gas space of the column, and the heat of reaction released is withdrawn from the product gas by washing with liquid sulfur. To this end, liquid sulfur is drawn off from the bottom of the column, mixed with fresh cold sulfur and introduced at the top of the column. The product gas, which comprises substantially hydrogen sulfide, is cooled in two heat exchangers. A disadvantage is found to be that the process has to be performed under pressure and at elevated temperature. The elevated temperature leads to increased corrosion rates and material attrition on the reactor walls. In the case of a leak, relatively large amounts of poisonous $H_2S$ escape owing to the elevated pressure.

A catalytic preparation of $H_2S$ is described in Angew. Chem.; volume 74, 1962; 4; page 151. In this preparation, hydrogen is passed through an externally heated sulfur bath. The hydrogen laden with sulfur vapor passes through bores into a catalyst space. Unreacted sulfur, after leaving the catalyst space, is condensed in an upper part of the $H_2S$ outlet tube and passes via a return tube back into the sulfur bath. The catalyst space is arranged concentrically about the $H_2S$ outlet tube. A disadvantage in the process on the industrial scale is that the heat of reaction is not utilized to heat the sulfur bath, but rather the heating is effected through the jacket of the sulfur bath.

DE 1 113 446 discloses the catalytic preparation of hydrogen sulfide by converting a stoichiometric mixture of hydrogen and sulfur over a catalyst comprising cobalt salt and molybdenum salt on a support at temperatures between 300 and 400° C. The catalyst is arranged in tubes which are flowed through by the mixture of hydrogen and sulfur. The sulfur bath has a temperature of from 340 to 360° C., as a result of which a stoichiometric mixture of hydrogen and sulfur is generated by passing hydrogen through the sulfur bath for the preparation of $H_2S$. The heat of reaction released in the $H_2S$ formation is utilized by direct heat exchange, since the tubes comprising the catalyst are arranged in the sulfur bath in a manner not described in detail.

U.S. Pat. 2,863,725 describes a process for preparing $H_2S$ over a molybdenum-comprising catalyst, wherein gaseous hydrogen is introduced into a reactor comprising a sulfur melt and rises through the sulfur melt in the form of gas bubbles. The amount of hydrogen introduced and the temperature of the sulfur melt (a temperature below 326° C. is reported) are adjusted such that a gas mixture which forms in a gas zone above the sulfur melt comprises the hydrogen and sulfur reactants with an excess of hydrogen above the stoichiometric reaction ratio.

This reactor, which is also described in U.S. Pat. 2,965,455, is a tube bundle reactor which is divided by a subdivision into an upper reactor region and a lower collecting region. The upper reactor region is filled partly with the sulfur melt, and, above the sulfur melt, the reactants collect in the gas zone which is in open connection with the upper ends of the tubes of the tube bundle. In the tubes, a molybdenum catalyst is arranged, over which the reaction to give $H_2S$ takes place in the gas phase. The gas mixture of the reactants enters the tubes at their upper ends, flows through them from the top downward, in the course of which it is converted over the catalyst, and, as a product-comprising gas, leaves the tubes at their lower ends which are in open connection to the collecting region of the reactor. The arrangement of the tubes within the sulfur melt allows heat exchange of the heat of reaction released in the reaction with the sulfur melt surrounding the tubes to take place. The contact tubes are connected to the subdivision at their lower ends, which provides an integral element for the support of the catalyst on the subdivision. A problem is found to be the particular connecting sites between subdivision and the catalyst tubes, which are exposed both to thermal and mechanical stresses and thus constitute regions at risk. The securing of the tubes only at their lower end on the subdivision leads to stability problems.

A further problem is found in the case of the introduction of hydrogen close to the subdivision into a lower region of the sulfur melt via a perforated inlet tube. Liquid sulfur can penetrate into the perforations of the inlet tube, especially in a startup phase of the process, and solidify at a corresponding temperature such that an inhibition or a blockage arises. This results in insufficient hydrogen feeding, such that the amount of sulfur stripped out of the sulfur melt by the hydrogen is too low for the desired molar ratio of the catalyzed reaction.

A general problem for the construction and material selection of a reactor for performing the preparation process of hydrogen sulfide is that of the thermal changes in length of the materials used, which are caused by temperature increase and temperature reduction during startup and shutdown phases of the process and can be different for the individual construction elements. One means of solving this problem consists in the integration of compensators, for example metallic bellows in the reactor jacket, which allows individual thermal changes in length to be absorbed. However, these compensators are frequently the sites of leakages which occur. Furthermore, for the materials of the individual elements, the highly corrosive properties of the hydrogen sulfide, especially marked at high temperatures, have to be noted, which causes high material costs for the construction of a reactor for preparing hydrogen sulfide.

It is accordingly an object of the present invention to provide a reactor and a process which avoid the disadvantages of the prior art and through which the preparation, especially continuous, of hydrogen sulfide becomes more efficient, improves energetically and becomes more economic.

The achievement of the object proceeds from a reactor for continuously preparing $H_2S$ by reacting a reactant mixture which comprises essentially gaseous sulfur and hydrogen over a catalyst, the reactor comprising a sulfur melt in a lower part of the reactor, into which gaseous hydrogen can be passed by means of a feed device. The catalyst is arranged (preferably as a fixed bed) in at least one U-shaped tube which is partly in contact with the sulfur melt, the at least one U-shaped tube having at least one entry orifice arranged above the sulfur melt in a limb through which the reactant mixture can enter the U-shaped tube from a reactant region of the reactor, having a flow path within the at least one U-shaped tube along which the reactant mixture can be converted in a reaction region in which the catalyst is arranged, and the at least one U-shaped tube having at least one exit orifice in another limb through which a product can exit into a product region (separate from the reactant region).

The reactor preferably comprises a cylindrical or prism-shaped central body surrounded by a reactor jacket which is closed at each end by a hood. The hoods may each have any suitable shape, for example be of hemispherical or conical shape.

The reactor is filled with a sulfur melt in a lower part. Gaseous hydrogen can be introduced into the sulfur melt through a feed device, in which case a reactant mixture comprising essentially gaseous sulfur and gaseous hydrogen collects above the sulfur melt in a reactant region which is in contact with the sulfur melt via a phase boundary and which is delimited at the top preferably by a subdivision, for example by a plate. In a preferred embodiment of the present invention, the plate is connected to the reactor jacket in an upper part of the reactor, preferably in the upper third, more preferably in the upper quarter, of the reactor interior.

In the inventive reactor, at least one U-shaped tube which is at least partly in contact with the sulfur melt is provided. The reactor is therefore designed as a kind of tube bundle reactor with catalyst tubes which, in accordance with the invention, are in a U-shaped configuration. Such a U-shaped tube has two limbs which are connected to one another by a curved region at their lower end. The U-shaped tubes may each have limbs of different lengths or preferably the same length. The U-shaped tubes may have, for example, a limb diameter between 2 and 20 cm, in particular between 2.5 and 15 cm, more preferably between 5 and 8 cm. The at least one U-shaped tube is preferably arranged vertically in the reactor, the curved region being disposed at the bottom and the two ends of the limbs at the top.

In connection with the present invention, "being in contact" means that a heat exchange can take place between the sulfur melt and the interior of the tube through the wall of the tube. The at least one U-shaped tube is preferably immersed partly into the sulfur melt.

Within the at least one U-shaped tube, a catalyst for converting hydrogen and sulfur to $H_2S$ is arranged, as a result of which a reaction region is provided. In connection with the present invention, the reaction region refers to that region within the U-shaped tubes in which the catalyst is disposed. The reactants are converted mainly in the reaction region which comprises the catalyst. The provision of a reaction region in U-shaped tubes allows a compact design of the reactor with regard to the reactor length, since the reaction region provided for the reaction of hydrogen with sulfur to give $H_2S$ can be divided on the two limbs of one U-shaped tube each. Use of the catalyst allows the conversion to $H_2S$ to be performed at moderate temperatures and at low pressure. The catalyst is preferably arranged in the at least one U-shaped tube in the form of a fixed bed of bulk material. Suitable catalysts are, for example, catalysts comprising cobalt and molybdenum on a support, which can be used as shaped bodies of any shape. For example, the diameter of the shaped bodies is from 2 to 12 mm, in particular between 3 and 10 mm, more preferably between 4 and 8 mm, and the length is preferably between 2 and 12 mm, in particular between 3 and 10 mm, more preferably between 4 and 8 mm.

In the preparation of hydrogen sulfide in the inventive reactor, the reactant mixture enters from the reactant region into a limb of the at least one U-shaped tube through at least one entry orifice. The entry orifice is arranged in a limb of the at least one U-shaped tube above the sulfur melt. The entry orifice opens from the reactant region into one limb of the U-shaped tube. The distance between the phase boundary of the sulfur melt and the entry orifice of the U-shaped tube is selected such that a minimum amount of liquid sulfur is entrained in the form of droplets with the stream of the reactant mixture into the interior of the U-shaped tubes. The distance between entry orifice and phase boundary of the sulfur melt is preferably between 0.3 and 3 m, in particular between 0.6 and 2.5 m, more preferably between 0.9 and 2 m.

In the preparation of hydrogen sulfide in the inventive reactor, the reactant mixture flows through the U-shaped tube along a flow path, i.e. it flows first, after entry through the entry orifice, through one limb of the U-shaped tube from the top downward, enters the second limb through the curved region of the U-shaped tube and then flows through the second limb from the bottom upward. The reactant mixture is converted mainly in the reaction region which is present within the U-shaped tube, over the catalyst arranged there. Through an exit orifice in the second limb of the U-shaped tube, the gas comprising the product enters a product region (which is preferably arranged above the sulfur melt and above the reactant region in the reactor), which is separated from the reactant region (for example by a plate).

Gaseous hydrogen and liquid sulfur are fed to the reactor via a suitable feed device. At a suitable point, the hydrogen sulfide product, for example at an upper hood, is passed out of the product region of the reactor.

The two limbs of a U-shaped tube are preferably each connected to a plate of the reactor at their upper end, the plate in turn being secured suitably in an upper part of the reactor on the reactor jacket. The plate subdivides the reactor preferably into two subregions; in particular, it determines a product region above it. The preferred securing of the at least one U-shaped tube on a plate connected to the reactor jacket allows thermal longitudinal changes of the reactor and of the U-shaped tubes independently of one another, since the U-tube bundle is secured on the jacket of the reactor only via the plate, so that it is possible to dispense with compensators in the construction of the reactor. The connection of the U-shaped tubes to the plate at the upper ends of their limbs advantageously achieves the effect that the tubes become stabilized according to gravity.

In a preferred embodiment of the present invention, a plate which divides the reactor interior into a lower subregion below it and an upper subregion above it is arranged in an upper section of the reactor, preferably close to the upper hood.

The upper subregion preferably comprises the product region, which comprises mainly the hydrogen sulfide product during the operation of the reactor. In each case one limb of the U-shaped tubes is an open connection with the product region.

The lower subregion of the reactor preferably comprises the reactant region directly below the plate and, below it, a sulfur melt into which liquid sulfur is fed from an external source and/or as reflux. Some of the U-shaped tubes are in thermal contact with the sulfur melt; some of them are preferably arranged directly within the sulfur melt, i.e. are immersed into the sulfur melt. A transfer of the heat energy released in the exothermic reaction to give $H_2S$ thus takes place via the at least one U-shaped tube into the surrounding sulfur melt. The heat of reaction is utilized for an evaporation of the sulfur present therein. This thermal coupling enables an energetically favorable process in which external heat supply can be reduced considerably or is not necessary. At the same time, overheating of the catalyst can be avoided, which increases the lifetimes of the catalyst.

For a good transfer of the heat energy, preference is given to minimizing the heat resistance of the catalyst bed in the reaction region. For the conversion of the reactants to $H_2S$, preference is given to providing a multitude of catalyst-comprising U-shaped tubes, so that the particular path from the core of the catalyst bed to the wall of the tube is low. A ratio of the sum of the cross-sectional areas of all catalyst tubes (or all limbs of the U-shaped catalyst tubes) based on the cross-sectional area of the (preferably cylindrical) reactor body is preferably between 0.05 and 0.9, especially between 0.15 and 0.7, more preferably between 0.2 and 0.5, most preferably between 0.25 and 0.4.

In order that there is sufficient thermal contact for the heat transfer from the U-shaped tube into the surrounding sulfur melt, the aim is that from 20 to 100% of the outer jacket area of a particular U-shaped tube along the reaction region comprising the catalyst is in contact with the sulfur melt. In order that the heat transfer into the sulfur melt functions efficiently, wherever the reaction takes place in the U-shaped tube, the outer jacket area of the U-shaped tube along the reaction region comprising the catalyst should be surrounded by the sulfur melt to an extent of more than 20%, preferably to an extent of more than 50%, more preferably to an extent of more than 80%. In the case of too low a fill level of the sulfur melt in the reactor and hence too low a contact of U-shaped tube and sulfur melt, there is the risk that the heat of reaction is not removed sufficiently.

In flow direction of the reactant mixture, within the at least one U-shaped tube, the reactant mixture, after entry into the U-shaped tube, can first flow through an inert bed, in which case any entrained liquid sulfur present in the form of droplets is separated out of the reactant mixture at this inert bed. For example, a proportion of liquid sulfur in the reactant mixture comprising gaseous hydrogen and sulfur of up to 100 000 ppm by weight may be present. For the separating-out of the sulfur droplets, a proportion of the inert bed, based on the overall bed composed of inert bed and catalyst bed, of from 1 to 30%, especially from 2 to 25%, preferably from 5 to 20%, more preferably from 8 to 16%, is preferably provided in the at least one U-shaped tube. The inert bed may consist of bodies of any shape, for example of saddles or preferably of spheres which are composed of a suitable material, for example zirconium oxide or preferably aluminum oxide.

In a preferred embodiment of the inventive reactor, gaseous hydrogen is introduced into the sulfur melt in the reactor by means of a feed device and distributed in the sulfur melt by means of a distributor device.

The distributor device preferably comprises a distributor plate which is arranged horizontally in the reactor and an edge which extends downward. The hydrogen introduced below the distributor device accumulates below the distributor plate to form a hydrogen bubble in the space which is bordered by the edge extending downward and the distributor plate.

The feed device preferably comprises a tube which is open at both ends and is arranged vertically in the reactor, and which is arranged below the distributor device and whose upper end projects preferably into the space which is defined by the distributor plate and the edge which extends downward, into the hydrogen bubble. Projection into the space below the distributor plate and especially into the hydrogen bubble formed below it advantageously prevents inhomogeneous hydrogen introduction into the sulfur melt.

An inlet tube which runs obliquely, through which the hydrogen is introduced from outside the reactor, preferably opens laterally into the vertical tube of the feed device. The feed device is advantageously configured such that sulfur which enters the tube arranged vertically can flow freely downward without blocking the feed device for the hydrogen. The hydrogen rises upward within the tube arranged vertically and collects below the distributor device.

The distributor device preferably comprises a distributor plate (preferably having passage orifices) which is arranged horizontally in the reactor and an edge extending downward. The preferably flat distributor plate extends preferably virtually over the entire cross-sectional area of the reactor, a gap remaining between reactor jacket and distributor device. The gap between the edge of the distributor device and the reactor jacket preferably has a width between 1 and 50 mm, in particular between 2 and 25 mm, more preferably between 5 and 10 mm. The shape of the distributor plate is guided by the geometry of the reactor in which it is arranged. It may preferably have a circular or polygonal shape or any other desired shape. Recesses may preferably be provided on the outer circumference of the distributor plate, which provide passage orifices, for example, for hydrogen introduction, sulfur introduction and sulfur recycling. The gap between distributor device and reactor jacket may thus have only a small width, so that severe vibration of the distributor device in the reactor is avoided. The hydrogen introduced below the distributor device accumulates below this distributor plate to form a hydrogen bubble in the space which is defined by the edge extending downward and the distributor plate. The distributor plate is preferably arranged horizontally in the reactor, so that the hydrogen bubble which accumulates below the distributor plate has virtually constant height.

The accumulated hydrogen is distributed in the sulfur melt via the edge extending downward when the hydrogen bubble has reached a certain height, and/or through passage orifices provided in the distributor plate. The hydrogen from the hydrogen bubble can be distributed in the sulfur melt via the edge through a gap between distributor device and reactor jacket. The edge region of the distributor device preferably has a serrated design, which allows the hydrogen accumulated to be dispersed divided into fine gas bubbles.

In a preferred embodiment, the distributor plate of the distributor device which is preferably arranged horizontally in the reactor comprises passage orifices. As a result of the passage orifices in the distributor plate, the accumulated hydrogen is dispersed with uniform distribution from the hydrogen bubble into the sulfur melt disposed above the distributor plate, which advantageously prevents vibrations within the reactor by means of uniform distribution of hydrogen over the reactor cross section. The number of passage orifices in the distributor plate is guided by factors including the volume flow rate of the hydrogen introduced and is preferably from 2 to 100, especially from 4 to 50, more preferably 8 to 20, per 100 standard $m^3/h$. The passage orifices may, for example, be circular or defined as slots, preferred diameters or slot widths being from 2 to 30 mm, preferably from 5 to 20 mm, more preferably from 7 to 15 mm. The passage orifices are preferably arranged regularly in the distributor plate. The areal proportion of the passage orifices, based on the area of the distributor plate, is preferably between 0.001 and 5%, preferentially between 0.02 and 1%, more preferably between 0.08 and 0.5%.

In order to ensure good mixing of the sulfur melt by the ascending hydrogen and thus to ensure very efficient stripping of the sulfur into the ascending hydrogen, the gas velocity of the hydrogen dispersed by the passage orifices is preferably from 20 to 400 m/s, especially from 50 to 350 m/s, preferably from 90 to 300 m/s, more preferably from 150 to 250 m/s.

When there is penetration of sulfur into the passage orifices, which solidifies within the passage orifices, especially in the case of lowering of the temperature, the hydrogen distribution at the distributor device through the passage orifices is inhibited. The accumulated hydrogen can then disperse into the sulfur melt via the edge region of the edge which extends downward.

In the case of simple introduction of hydrogen, for example, via a vertical inlet tube without such a distributor device into the sulfur melt, an inhomogeneous hydrogen distribution can arise. In the vicinity of the inlet tube, large bubbles of hydrogen rise within the sulfur melt. In other regions of the sulfur melt, there is then barely any hydrogen. As a result, vibrations of the U-shaped tubes can be induced. The distributor device which is preferably present in the inventive reactor and is configured like a bell open at the bottom therefore also serves to stabilize the U-shaped tubes of the tube bundle in the inventive reactor.

In order to achieve greater stability of the U-shaped tubes, the at least one U-shaped tube may be connected to the distributor device close to its lower curved region, said distributor device limiting the vibration region of the U-shaped tube or of the corresponding tube bundle in the horizontal direction through its dimensions. In this case, the distributor device is in turn not connected directly to the reactor jacket of the reactor, but rather is connected indirectly to the reactor jacket via the connection of the U-shaped tubes to the plate. As a result, problems due to stresses between reactor, U-shaped tubes and distributor device caused by the thermal changes in length are avoided.

In one embodiment, the distributor plate is connected to the particular limbs of the at least one U-shaped tube close to the lower end of the U-shaped tube, for example welded, a section of the U-shaped tube which comprises at least part of the curved region being disposed below the distributor plate. Since this section of the U-shaped tube is not in contact with the sulfur melt but rather projects into the region of the hydrogen bubble accumulated below the distributor device, the U-shaped tube in this section preferably does not comprise any catalyst bed. There is thus no conversion to $H_2S$ and no exothermic heat of reaction to be removed arises. Within the at least one U-shaped tube, subdivisions may be provided, which separate the region of the catalyst bed from the region without bed, although the subdivisions have to be permeable for reactants and products for the $H_2S$ preparation.

In the present invention, a feed device and a distributor device for gaseous hydrogen are preferably provided in a lower section of the reactor, for example close to the lower hood. The hydrogen introduced into the sulfur melt by means of the feed device rises in the form of gas bubbles distributed by the distributor device through the melt, which strips sulfur out of the melt, and accumulates (for example below an upper plate of the reactor) in the reactant region of the reactor as a reactant mixture which is in contact with the sulfur melt via a phase boundary. The reactant mixture comprises gaseous hydrogen and sulfur in a molar ratio which is established by the prevailing process parameters, i.e. temperature, pressure and the amount of hydrogen introduced, according to the evaporation equilibrium of the sulfur. In this context, it is possible through the selection of the process parameters to establish an excess of hydrogen or sulfur or else a molar ratio corresponding to the reaction stoichiometry, according to the desired reaction for the conversion to $H_2S$. In the case of the present invention, preference is given to establishing an excess of sulfur in order to achieve a substantially complete reaction of hydrogen with sulfur to give $H_2S$. The sulfur excess per kilogram of $H_2S$ obtained is preferably between 0.2 and 3.0, in particular between 0.4 and 2.2, preferably between 0.6 and 1.6, more preferably between 0.9 and 1.2.

The invention also provides a process for continuously preparing $H_2S$ by converting a reactant mixture which comprises essentially gaseous sulfur and hydrogen over a catalyst, comprising provision of a sulfur melt at least in a lower region of a reactor into which gaseous hydrogen is introduced. In the process, the reactant mixture is introduced from a reactant region into a limb of at least one U-shaped tube through at least one entry orifice arranged above the sulfur melt, passed along a flow path through the at least one U-shaped tube which is partly in contact with the sulfur melt, and converted over a catalyst arranged in a reaction region in the flow path. A product is passed out of at least one exit orifice in another limb of the U-shaped tube into a product region (preferably separated from the reactant region). The inventive process is preferably performed in the inventive reactor already described.

The inventive process for preparing $H_2S$ is preferably performed at temperatures of the reactant mixture and of the reactant region comprising the catalyst of from 300 to 450° C., preferably from 330 to 425° C., more preferably from 330 to 400° C., which minimizes the corrosion stress on the materials selected for the construction elements. The temperature of the sulfur melt is preferably between 300 and 450° C., especially between 330 and 425° C., preferably between 330 and 400° C., more preferably between 350 and 360° C. The temperature in the reactant space above the sulfur bath is preferably between 300 and 450° C., especially between 330 and 425° C., preferably between 330 and 400° C., more preferably between 350 and 360° C. The product mixture which exits from the U-shaped tubes into the product space preferably has a temperature between 300 and 450° C., especially between 330 and 425° C., preferably between 330 and 400° C., more preferably between 350 and 360° C. The pressures in the jacket space of the reactor and in the interior of the U-shaped tubes are preferably from 0.5 to 10 bar, in particular from 0.75 to 5 bar, more preferably from 1 to 3 bar and most preferably from 1.1 to 1.4 bar absolute.

The hydrogen introduced in the inventive process is preferably dispersed into the sulfur melt at a distributor device provided in the lower section of the reactor. The hydrogen is distributed in the sulfur melt from a hydrogen bubble accumulated under the distributor device preferably by means of a distributor plate of the distributor device which is arranged horizontally within the reactor through passage orifices provided therein and/or by means of an edge which extends downward from the distributor plate. Especially when there is inhibition of the passage of the hydrogen through passage orifices in the distributor plate, for example by sulfur deposited therein, the hydrogen bubble accumulates within the space defined by the distributor plate and by the edge which extends downward, so that hydrogen flows into the sulfur melt via the edge region of the edge which extends downward. In this case, hydrogen passes from the hydrogen bubble under the distributor device through a gap between distributor device and reactor jacket into the sulfur melt present above the distributor device. In this way, it is ensured that the hydrogen is distributed within the sulfur melt in a sufficient amount during the continuous preparation of $H_2S$.

The distributor device more preferably has passage orifices in the distributor plate, through which hydrogen disperses from a hydrogen bubble accumulated below the distributor plate into the sulfur melt present above the distributor plate.

The evaporation rate of the sulfur in the present invention is preferably adjusted such that the reactant mixture comprises a sulfur excess. The excess sulfur is then fed out of the product region of the reactor with the product and subsequently separated out as a melt. This liquid sulfur can, for example, be recycled via a collecting and diverting construction arranged in the upper subregion of the reactor, comprising, inter alis, a collecting tray and a return tube which proceeds therefrom and is immersed into the sulfur melt, into the sulfur melt present in the lower subregion of the reactor. The $H_2S$ gases leaving the reactor are preferably cooled in a heat exchanger, the excess sulfur being condensed out and passed back into the sulfur melt via the collecting and diverting construction. The cooling medium used may be warm pressurized water in a secondary circuit.

The present invention will be illustrated in detail below with reference to the reactor illustrated in FIG. 1 and with reference to the distributor illustrated in FIG. 2.

FIG. 1 shows a schematic of a preferred embodiment of an inventive device in longitudinal section.

The reactor 1 is closed with hoods 3, 4 at both ends of a cylindrical body 2. At the upper hood 3, a product can be drawn off. At the lower hood 4 is disposed a discharge stop 5 in order possibly to completely discharge the contents of the reactor 1. In an upper section of the reactor 1, a plate 6 is provided, which separates an upper subregion comprising a product region 7 from a lower subregion 8. The plate 6 is connected to a reactor jacket 25 of the reactor 1. The lower subregion 8 is filled partly with a sulfur melt 9 which is in contact via a phase boundary with a reactant region 10 which is bordered at the top by the plate 6. The reactant region 10 comprises mainly gaseous hydrogen and sulfur.

The hydrogen is introduced into the sulfur melt 9 via a feed device 11 into a lower section of the reactor 1, for example in the lower hood 4. The feed device 11 comprises a line 12 which runs obliquely and opens laterally into a tube 13 which is arranged vertically in the reactor 1 and is open at the top and bottom. The upper end of the tube 13 projects into a space 14 which is bordered by a distributor device 15. The distributor device 15 comprises a distributor plate 16 arranged horizontally in the reactor 1 and an edge 17 which extends downward and has a preferably serrated edge region 18. The hydrogen introduced via the feed device 11 rises upward within the vertical tube 13 and collects below the distributor plate 16 to form a hydrogen bubble. Passage orifices 19 in the distributor plate 16 disperse the hydrogen in the sulfur melt 9 present above it, and it rises upward in the form of gas bubbles within the sulfur melt 9, which strips sulfur out of the sulfur melt 9. This forms a reactant mixture comprising gaseous hydrogen and sulfur in the reactant region 10 above the sulfur melt 9.

When the passage orifices 19 in the distributor plate 16 for hydrogen passage are blocked, the hydrogen can also be dispersed from the hydrogen bubble accumulated below the distributor plate 16 via the edge region 18 into a gap 20 between the reactor jacket 25 and the edge 17 of the distributor device 15 into the sulfur melt 9.

Arranged within the cylindrical body of the reactor 1 are tubes 21 which, in accordance with the invention, have a U-shaped design. The U-shaped tubes 21 are connected to the plate 6 by their two limbs 26, 27. The connection of the limbs 26, 27 to the plate 6 can be established by weld seam. The U-shaped tubes 21 are immersed partly into the sulfur melt 9, which gives rise to the possibility of direct heat exchange between the interior of the tubes 21 and the sulfur melt 9 via the outer jacket surface 28 of the tubes 21. Within each U-shaped tube 21 is arranged a fixed catalyst bed 22 which is provided in the two limbs 26, 27 of the U-shaped tubes 21.

As shown in FIG. 1, the distributor device 15 is connected to the U-shaped tubes 21, and a portion and especially the transition from one limb 26 to the second limb 27 of the particular U-shaped tubes 21 runs below the distributor plate 16 through the space 14. Since this section of the U-shaped tubes 21 projects into the accumulated hydrogen bubble and is not in direct contact with the sulfur melt 9, this section does not comprise any catalyst. The gap 20 is positioned between the distributor device 15 and the reactor jacket 25. The distributor device 15 is not connected directly to the reactor jacket 25.

In the reactor 1, the inventive preparation of hydrogen sulfide proceeds as follows. A reactant mixture passes from the reactant region 10 through one or more entry orifices 23 arranged on the circumference of a limb 26 of each of the U-shaped tubes 21 into the interior of one limb 26 of the U-shaped tube 21, flows through the catalyst bed 22 present therein, which may be supplemented by an upstream inert bed, and is converted substantially to hydrogen sulfide along the flow path within the reaction region comprising fixed catalyst bed 22. The product passes out of the second limb 27 via at least one exit orifice 24 into the product region 7 and can be collected and discharged from there via hood 3. As a result of the direct contact of the U-shaped tubes 21 with the sulfur melt 9, the heat of reaction released in the conversion to $H_2S$ is released from the fixed catalyst bed 22 into the sulfur melt 9 via the outer jacket surface 28 of the U-shaped tubes along the reaction region, and it is utilized for sulfur evaporation.

In order to keep the sulfur melt 9 at about the same height during the process, gaseous hydrogen and liquid sulfur are fed in appropriate amounts to the reactor 1 continuously via the feed device 11 and a sulfur inlet 29. Excess sulfur which is precipitated out of the product as a melt passes out of the first line 30 to a collecting and diverting construction arranged in the upper subregion of the reactor 1. This collecting and diverting construction comprises a collecting tray 31, on which inlet stubs 34 are arranged for passing the product from the product region 7 disposed below the collecting tray 31 into the product region 7 disposed below it, and an edge 35. The liquid sulfur separated out is collected on a collecting tray 31 which is arranged horizontally in the product region 7 of the reactor 1, and recycled via a return tube 32 immersed into the sulfur melt 9 into the sulfur melt 9 present in the lower subregion of the reactor 8. The reactor 1 is preferably insulated, so that the energy consumption is at a minimum.

Figure 2:
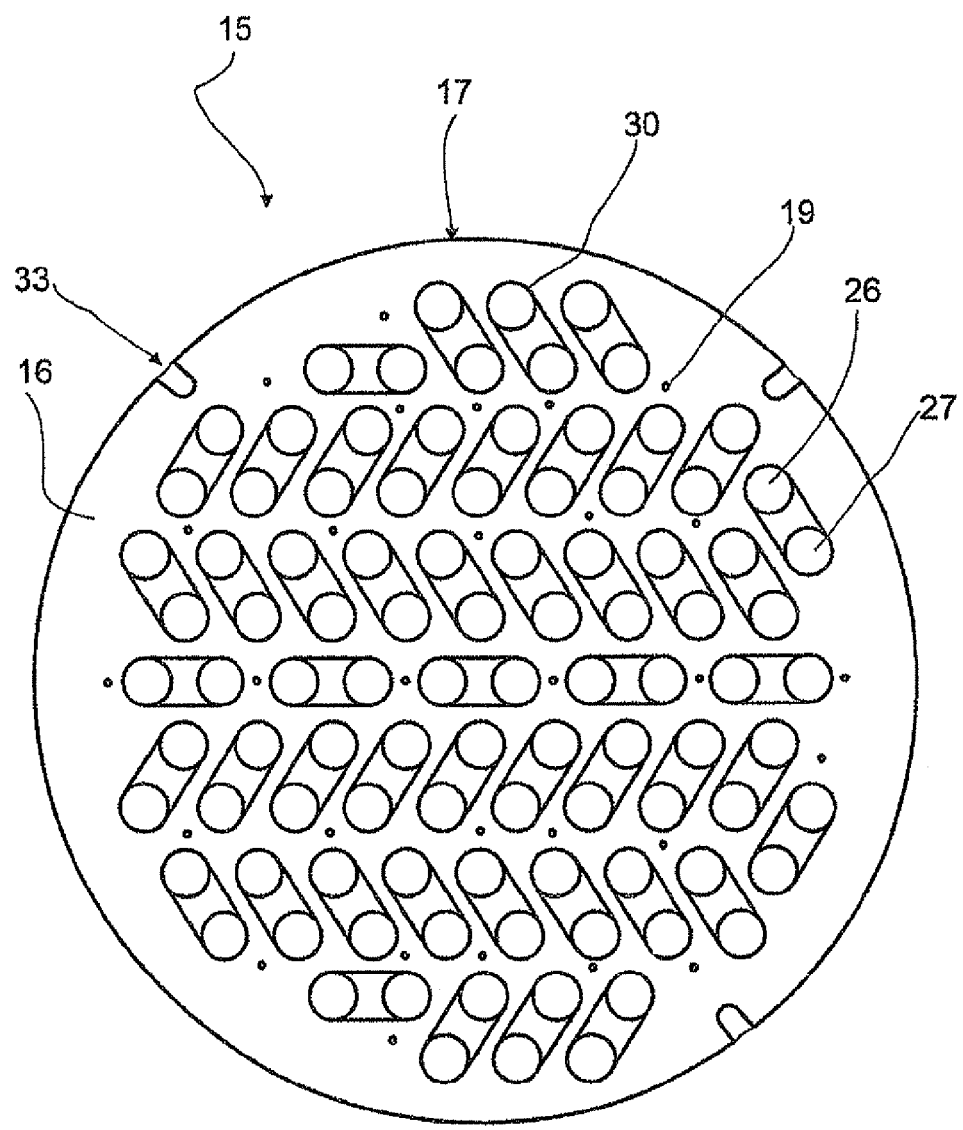

FIG. 2 shows a top view on a distributor device which is arranged in a preferred embodiment of an inventive reactor.

The distributor device 15 preferably comprises a distributor plate 16 which has passage orifices 19 and is to be arranged horizontally in the reactor 1, and an edge 17 extending downward. The flat distributor plate 16 extends preferably virtually over the entire cross-sectional area of the reactor 1, leaving a gap between reactor jacket and edge 17. The shape of the distributor plate 16 is guided by the geometry of the reactor in which it is arranged. In the present case, it is circular. The hydrogen introduced below the distributor device 15 accumulates below this distributor plate 16 to give a hydrogen bubble in the space which is bordered by the edge extending downward and the distributor plate. The hydrogen accumulated is dispersed through the passage orifices 19 in the distributor plate 16 in homogeneous distribution from the hydrogen bubble into the sulfur melt disposed above the distributor plate 16.

FIG. 2 illustrates one possible arrangement of the passage orifices 19 in the distributor plate 16, which are arranged in circular form. Likewise shown in the distributor plate 16 are passages 30 through which the limbs 26, 27 of the U-shaped tubes 21 pass in the inventive reactor and, for example, are connected to the distributor plate 16 by a weld seam. On the circumference of the distributor plate 16, recesses 33 are provided, in which the inlets for hydrogen 12, for sulfur 29 and the sulfur reflux tube 32 are accommodated.

REFERENCE NUMERAL LIST

1 Reactor
2 Reactor body
3 Upper hood
4 Lower hood
5 Outlet stub
6 Plate
7 Product region
8 Lower subregion of reactor
9 Sulfur melt
10 Reactant region
11 Feed device for hydrogen
12 Line
13 Tube arranged vertically
14 Space
15 Distributor device
16 Distributor plate
17 Edge
18 Edge region
19 Passage orifices
20 Gap
21 Tubes
22 Fixed catalyst bed
23 Entry orifice
24 Exit orifice
25 Reactor jacket
26 First limb
27 Second limb
28 Outer jacket surface
29 Sulfur inlet
30 Passages
31 Collecting tray
32 Return tube
33 Recesses
34 Inlet stub
35 Edge

The invention claimed is:

1. A reactor for continuously preparing $H_2S$ by converting a reactant mixture, which comprises essentially gaseous sulfur and hydrogen, over a catalyst, the reactor comprising:
a lower part containing a sulfur melt;
a feed device adapted to pass gaseous hydrogen into the lower part;
a reactant region adapted to contain the reactant mixture;
a product region; and
at least one U-shaped tube partially disposed within the lower part and placed in contact with the sulfur melt, the at least one U-shaped tube including:
a first limb extending into the reactant region and having at least one entry orifice disposed within the reactant region;
a second limb extending up to the product region and having at least one exit orifice within the product region; and
a flow path connecting the at least one entry orifice to the at least one exit orifice along the U-shaped tube, wherein the catalyst is disposed in a reaction region along the flow path for converting the reactant mixture into a product.

2. The reactor according to claim 1, wherein the at least one U-shaped tube includes an outer jacket surface along the reaction region, and more than 20% of the outer jacket surface is in contact with the sulfur melt.

3. The reactor according to claim 1, further comprising a reactor jacket, wherein the at least one U-shaped tube is suspended from a plate connected to the reactor jacket.

4. The reactor according to claim 3, wherein the plate is disposed between the reactant region and the product region.

5. The reactor according to claim 1, wherein an inert bed is arranged upstream, relative to a flow direction of the reactant mixture in the U-shaped tube, of the catalyst along the flow path.

6. The reactor according to claim 1, further comprising a distributor device having a distributor plate arranged in the sulfur melt and a downward extending edge adapted to induce formation of a hydrogen bubble below the distributor plate, the hydrogen from the hydrogen bubble being distributable in the sulfur melt via the downward extending edge.

7. The reactor according to claim 6, wherein the distributor plate includes passage orifices for passing hydrogen out of the hydrogen bubble into the sulfur melt.

8. The reactor according to claim 6, wherein the distributor device is connected to the at least one U-shaped tube.

9. The reactor according to claim 6, wherein a lower part of the at least one U-shaped tube extends below the distributor plate and the flow path within the lower part does not include any catalyst.

10. The reactor according to claim 1, wherein a ratio of the sum of the cross-sectional areas of the first and second limbs of the at least one U-shaped tube to the cross-sectional area of the reactor body is between 0.05 and 0.9.

11. A process for continuously preparing $H_2S$ by converting a reactant mixture, which comprises essentially gaseous sulfur and hydrogen, over a catalyst, comprising:
providing a sulfur melt at least in a lower part of the reactor;
introducing gaseous hydrogen into the lower part of the reactor to generate the reactant mixture in a reactant region;
introducing the reactant mixture the reactant region into a first limb of at least one U-shaped tube through at least one entry orifice disposed above the sulfur melt;
passing the reactant mixture along a flow path through the at least one U-shaped tube, which is partly in contact with the sulfur melt, the flow path including a reaction region in which the catalyst is disposed, wherein the reactant mixture is passed over the catalyst to generate a product; and
passing the product out of at least one exit orifice in a second limb of the U-shaped tube into a product region.

12. The process according to claim 11, further comprising distributing gaseous hydrogen in the sulfur melt via a distributor device arranged in the sulfur melt, which comprises a distributor plate arranged horizontally in the reactor with a downward extending edge to induce formation of a hydrogen bubble below the distributor plate, the hydrogen from the hydrogen bubble being distributed in the sulfur melt by the distributor device.

13. The process according to claim 12, wherein distributing gaseous hydrogen in the sulfur melt via the distributor device includes passing hydrogen out of the hydrogen bubble into the sulfur melt via orifices included in the distributor plate.

* * * * *